United States Patent [19]

Huang

[11] Patent Number: 5,461,432
[45] Date of Patent: Oct. 24, 1995

[54] FASTENING SYSTEM FOR HINGES OF EYEGLASSES

[76] Inventor: Chi-Ming Huang, No. 168, Chung Lun, Chung Sha Village, An Ting Hsiang, Tainan Hsien, Taiwan

[21] Appl. No.: 313,864

[22] Filed: Sep. 28, 1994

[51] Int. Cl.⁶ ................................................. G02C 5/22
[52] U.S. Cl. ........................................ 351/153; 16/228
[58] Field of Search ............................ 351/153, 111, 351/119, 120, 121; 2/453; 16/228

[56] References Cited

U.S. PATENT DOCUMENTS 1,958,952  1/1934  Pappert .................................... 351/120

FOREIGN PATENT DOCUMENTS 402449  5/1966  Switzerland ........................... 351/120
0623876  5/1949  United Kingdom .................... 16/228

*Primary Examiner*—William L. Sikes
*Assistant Examiner*—Huy Mai
*Attorney, Agent, or Firm*—Morton J. Rosenberg; David I. Klein

[57] ABSTRACT

A hinge for temples of eyeglasses has a sidewise rectangular block extending sidewise from its body to fit in a hole of a bent projection of a lens rim, and an ear with a threaded hole at the rear end for a screw to engage. The screw also engages with a threaded hole of an ear at the front end of a temple so that the hinge may be combined with the temple. And the sidewise block of the hinge has several slanting saw-teeth on two opposite vertical sides to engage the walls defining the hole of the bent projection of the lens rim after the block is fitted in the hole so that the hinge may be firmly combined with the lens rim.

1 Claim, 3 Drawing Sheets

FASTENING SYSTEM FOR HINGES OF EYEGLASSES

BACKGROUND OF THE INVENTION

This invention concerns a hinge for combining temples of eyeglasses with a lens rim, particularly that provided with a sidewise block having slanting saw-teeth to firmly engage the walls defining a hole of a bent projection of a lens rim so that the hinge may be tightly combined with the lens rim without using a screw.

A known conventional eyeglasses shown in FIGS. 4 and 5 has a lens frame 11, two temples 12, 12 and two hinges 13, 13 combined together. The lens frame 11 has two lens rims 111, 111 connected with a bridge 112, and each lens rim 111 has a bent projection 113 provided with a recess 114 and a hole 115. Each temple 12 has an ear 122 bored with a threaded hole 121. Each hinge 13, as shown in FIG. 6, has an ear 132 bored with a threaded hole 131 welded on itself, so a screw 14 may povitally combine the hinge 13 with the temple 12 by engaging the threaded holes 121, 131. The hinge 13 also has a sidewise pin 33 to fit in the hole 115 of the bent projection 113 of the lens rim 111, and then a screw threads through the hole 115 and engage with the pin 33 to tightly combine the lens rim 111 with the hinge 13. Consequently, the hinge 13 combines the lens rim 111 with the temple 12.

However, the above-mentioned conventional hinge for temples of eyeglasses has been found to have poor firmness because of some disadvantages of 1. complicated process in making, 2. slim combination of the hinge and the lens rim by means of a very small pin 133 and the screw 15, 3. liable break of the hinge because of the screw 15 too excessively screwed with the pin 133 as shown in FIG. 7.

SUMMARY OF THE INVENTION

The object of this invention is to offer a hinge for temples of eyeglasses, which is provided with a sidewise block formed with several slanting saw-teeth on two opposite vertical sides to firmly engage the walls defining a hole formed in a bent projection of a lens rim after the sidewise block is fitted in the hole of the bent projection so that the hinge and the lens rim may be combined together firmly and easily.

BRIEF DESCRIPTION OF DRAWINGS

The invention will be better understood by reference to the accompanying drawings, wherein.

DESCRIPTION OF THE PREFERRED EMBODIMENTS

Figure 1:
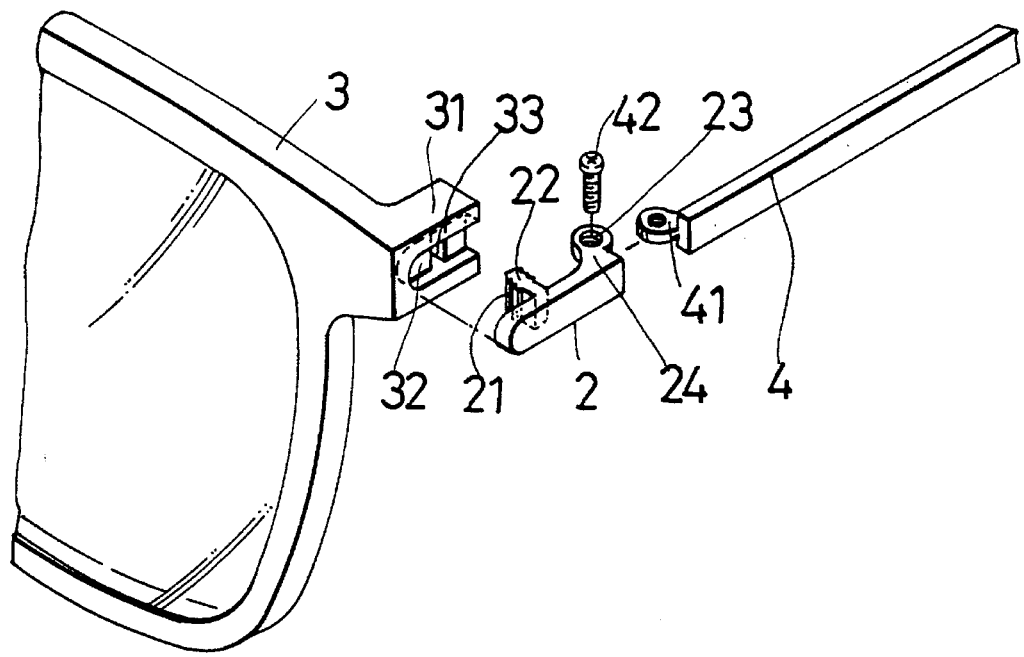
FIG. 1 is a perspective view of a hinge for temples of eyeglasses in the present invention.
Figure 2:
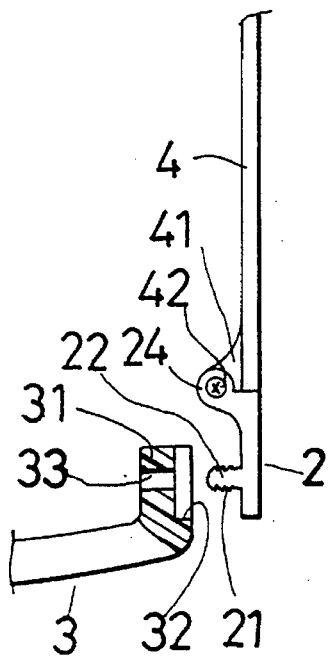
FIG. 2 is an upside view of the hinge for temples of eyeglasses in the present invention.
Figure 4:
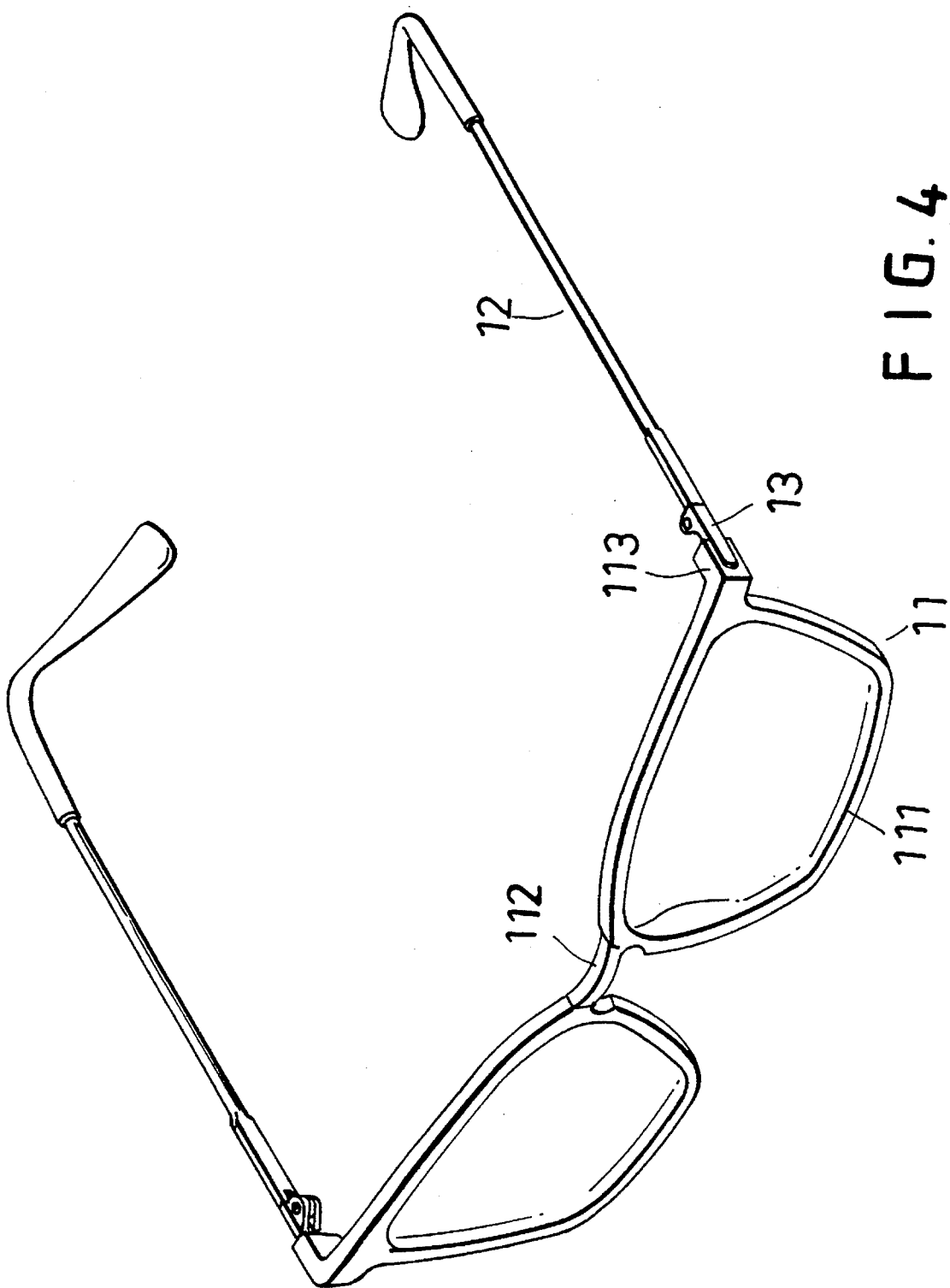
FIG. 4 is a perspective view of a known conventional pair of eyeglasses.
Figure 5:
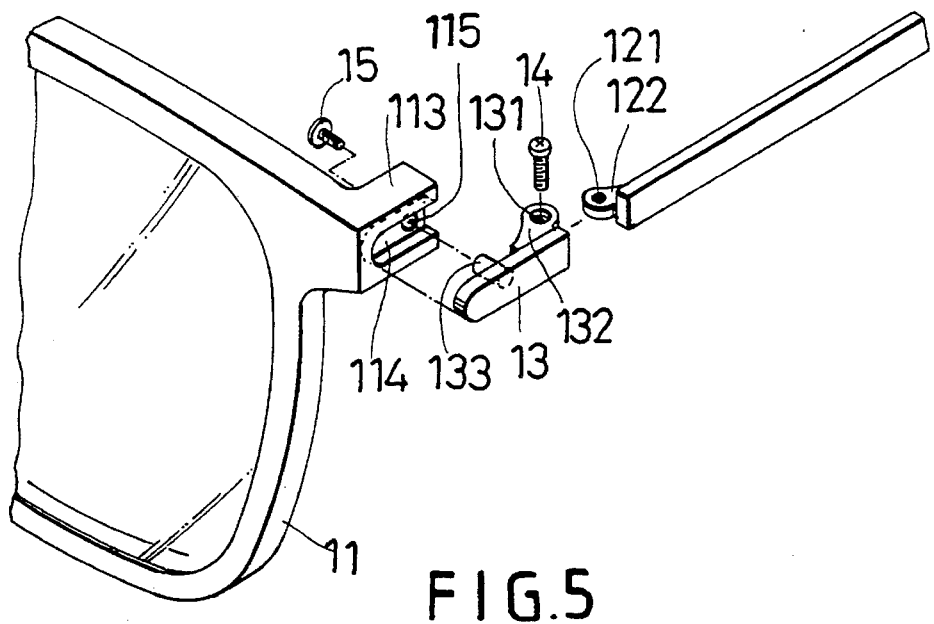
FIG. 5 is a perspective view of a hinge of the known conventional eyeglasses.
Figure 7:
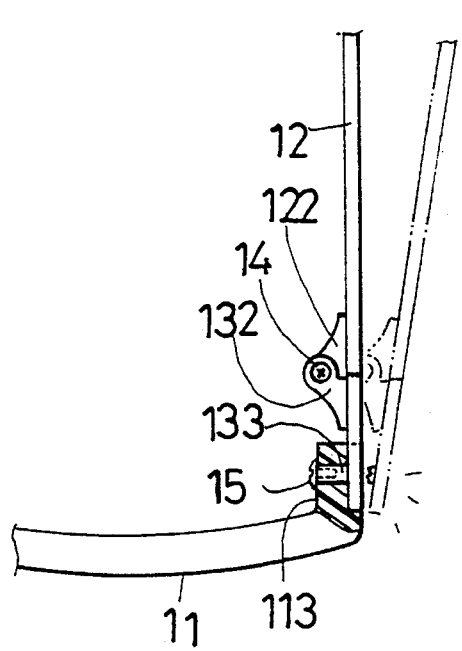
Figure 6:
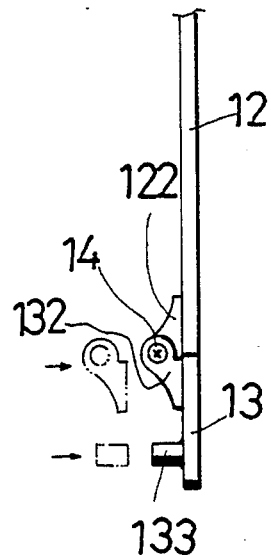
FIG. 6 is an upside view of the hinge combined with a temple of the known conventional eyeglasses; and, FIG. 7 is an upside view of the hinge combined with a temple of the known conventional eyeglasses, showing it broken.

A hinge 2 for temples of eyeglasses in the present invention, as shown in FIGS. 1 and 2, has a rectangular block 22 extending sidewise and inward from its body of a rectangular cross-section, and several slanting saw teeth 21 respectively formed on two opposite vertical sides of the rectangular block 22, an ear 24 bored with a threaded hole 23 formed at the rear end. A lens rim 3 has a bent projection 31 at an upper side end, and the bent projection 31 is provided with a recess 32 and a sidewise hole 33 in the side wall of the recess 32 for the rectangular block 22 of the hinge 2 to fit therein.

Figure 3:
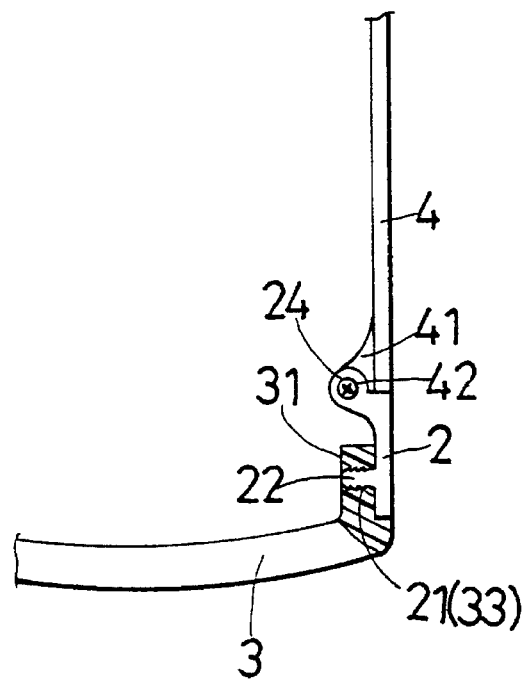
FIG. 3 is an upside view of the hinge combined with a temple and with a lens rim of eyeglasses in the present invention.

In assembling, referring to FIG. 3, the ear 24 of the hinge 2 is combined together with an ear 41 with a threaded hole at the front end of a temple 4 by means of a screw 42. Then the body of the hinge 2 is fitted in the recess 32 of the bent projection 31 of the lens rim 3, with the rectangular block 22 firmly pushed in the hole 33 of the projection 31 and with the slanting saw teeth 21 tightly engaging the walls defining the hole 33, keeping the hinge 2 firmly combined with the lens rim 3 without possibility of loosening and separating therefrom.

As can be realized from the above description, the hinge for temples of eyeglasses in the present invention has the following advantages:

1. The hinge is easily formed by plastic injecting process, provided with the rectangular block and the ear, far simpler in manufacturing than the conventional one having a small projection and a separate ear joined together by welding.

2. The hinge does not need to be combined with a lens rim with a screw, without possibility of loosing or separating or breaking as the conventional one does, and can be easily combined with the lens rim, only by pushing the projecting block in the hole of the bent projection of the lens rim.

3. The hinge is formed by injecting process, which is far simpler than mechanical process needed in manufacturing the conventional hinge, resulting in a consequent cost saving.

While the preferred embodiments of the invention have been described above, it will be recognized and understood that various modifications may be made therein and the appended claims are intended to cover all such modifications which may fall within the spirit and scope of the invention.

What is claimed is:

1. A fastening system for hinges of eyeglasses, comprising:

an eyeglass frame having a pair of bent projections extending from opposing ends thereof, each of said pair of bent projections having a recess formed therein, said recess having an opening formed therein having four walls with one pair of opposing walls being longer than an other pair of opposing walls to define a rectangularly shaped aperture formed in a recessed wall surface of said bent projection;

a pair of hinge bodies for coupling to said pair of bent projections, each of said hinge bodies having a rectangular cross-sectional contour dimensioned to be received within a respective one of said recesses, each of said hinge bodies having a rectangularly shaped block extending from a bottom surface thereof for receipt within said rectangularly shaped aperture, said block including a pair of opposing side walls having a plurality of angled saw-tooth shaped projections formed thereon for engagement with said longer pair of opposing aperture walls to tightly connect said hinge body to said eyeglass frame within said recess, each of said hinge bodies having a first ear formed on a rear end thereof, said first ear having a threaded through bore formed therein; and a pair of temple members pivotally coupled to said pair of hinge bodies, each of said temple members having a second ear formed on one end thereof, said second ear having a threaded through bore formed therein for pivotal coupling with a respective first ear by a screw threadedly engaged through said through bore of said first ear and said through bore of said second ear.

* * * * *